(12) United States Patent
Kaite et al.

(10) Patent No.: US 6,281,661 B2
(45) Date of Patent: Aug. 28, 2001

(54) METHOD OF CHARGING A PLURALITY OF BATTERIES

(75) Inventors: Osamu Kaite, Tsuna-gun; Tomoya Fukuda, Mihara-gun, both of (JP)

(73) Assignee: Sanyo Electric Co., Ltd., Moriguchi (JP)

( * ) Notice: Subject to any disclaimer, the term of this patent is extended or adjusted under 35 U.S.C. 154(b) by 0 days.

(21) Appl. No.: 09/768,227

(22) Filed: Jan. 25, 2001

(30) Foreign Application Priority Data

Jan. 27, 2000 (JP) .................................................. 12-018232

(51) Int. Cl.$^7$ .................................................. H01M 10/46
(52) U.S. Cl. ............................................. 320/116; 320/139
(58) Field of Search ..................................... 320/116, 117, 320/123, 125, 137, 139, 141, 160

(56) References Cited

U.S. PATENT DOCUMENTS 5,514,946  *  5/1996  Lin et al. .
5,539,298  *  7/1996  Perkins et al. .

* cited by examiner

*Primary Examiner*—Edward H. Tso
(74) *Attorney, Agent, or Firm*—Wenderoth, Lind & Ponack, L.L.P

(57) ABSTRACT

The method of charging a plurality of batteries uses a charging power supply to pulse charge a plurality of batteries to full charge by time-division switching of the battery being charged. Further, this charging method moves timing intervals forward to begin charging the next battery when charging of a fully charged battery is stopped.

13 Claims, 4 Drawing Sheets

METHOD OF CHARGING A PLURALITY OF BATTERIES

This application is based on application No. 018232/2000 filed in Japan on Jan. 27, 2000, the content of which is incorporated hereinto by reference.

BACKGROUND OF THE INVENTION

This invention relates to a method of charging a plurality of batteries sequentially with pulse charging. The batteries charged by the method of this invention are from one to four single rechargeable batteries, or a single battery or plurality of batteries contained in a battery pack.

Prior art methods of fully charging a plurality of batteries include methods of charging all batteries at once, and methods which sequentially fully charge batteries by time-division switching. Methods of charging all batteries at once include methods which connect batteries in series for charging, and methods which connect batteries in parallel for charging. Since the same charging current flows through all batteries connected in series, series connected methods cannot charge all batteries to full charge if there are differences in remaining battery capacity when charging is initiated. This is because batteries with large remaining battery capacity will be over-charged, and batteries with small remaining battery capacity won't reach full charge. In methods which connect a plurality of batteries in parallel, charging current cannot be uniformly distributed to charge all batteries in an ideal fashion. For example, larger currents will flow in low voltage batteries than in high voltage batteries making it impossible to uniformly distribute charging current. Therefore, all batteries cannot be fully charged under ideal conditions.

This drawback can be eliminated by providing special purpose charging circuitry to establish optimum charging current for each battery. However, battery charger cost for this method of charging becomes high. For example, to charge four batteries under ideal conditions four sets of charging power supplies are required.

As a method of charging a plurality of parallel connected batteries with one charging power supply, it is theoretically possible to distribute charging current to each battery in an ideal fashion by connecting current control circuits in series with each battery. However, practical realization is difficult because each current control circuit itself adjusts internal resistance to control battery charging current, and thus has the drawback of high power consumption. It is necessary to design current control circuits able to control high currents and power making parts cost expensive. In addition, since the current control circuits consume wasted power, it is necessary to design the charging power supply to output higher power. Further, large amounts of heat are generated by the current control circuits requiring a large cooling fan and increasing the parts cost.

These drawbacks can be eliminated by a method which charges a plurality of batteries by sequentially switching from one battery to the next. Since this method charges by sequentially switching from a fully charged battery to the next battery, it has the characteristic capability of fully charging a plurality of batteries with a single charging power supply while controlling charging current to ideal values.

This method of charging is described in Japanese Non-examined Patent Publications No. 4-105521 issued on Apr. 7, 1992 and No. 3-164034 issued on Jul. 16, 1991. The method cited in these and other patent applications initially supplies charging current to only the first battery and charges that battery to full charge. Then, after the first battery reaches full charge, charging of the first battery is cut-off and charging current is supplied to only the second battery which is charged to full charge. In this fashion, charging is switched from the first, second, third, and subsequent batteries to fully charge all batteries.

A method of charging a plurality of batteries by switching from one to the next can fully charge batteries sequentially while keeping the charging current small. However, this charging method has the drawback that it takes too much time to fully charge all batteries. If charging current is increased to reduce the time to full charge, battery performance is degraded. This is because the maximum current for acceptable battery charging is limited. If charging is performed extremely rapidly with large currents, battery temperature rises or the battery is adversely affected causing degradation in electrical performance.

As shown in FIG. 1, this drawback can be eliminated with a method of pulse charging a plurality of batteries by sequential time-dimension switching. FIG. 1 shows pulse charging of a first, second, third, and fourth battery by repeated time-division switching through the charging order. Further, FIG. 1 shows the first battery reaching full charge first and the third battery reaching full charge next. Since charging stops for a fully charged battery, charging is cut-off to that battery.

As shown in FIG. 1, a time-division pulse charging method can reduce charging time for a plurality of batteries compared to a method which switches charging after each battery is fully charged. However, since timing is temporarily interrupted when a battery reaches full charge, all batteries cannot be quickly charged under the most ideal conditions.

The present invention was developed to eliminate these types of drawbacks, It is thus a primary object of the present invention to provide a method of charging that can fully charge a plurality of batteries in a shorter time.

It is yet another important object of the present invention to provide a method of charging a plurality of batteries which can rapidly charge all batteries to full charge without causing battery performance degradation.

It is a further important object of the present invention to provide a method of charging a plurality of batteries which can rapidly charge all batteries to full charge with a charging power supply that can be inexpensively manufactured.

The above and further objects and features of the invention will more fully be apparent from the following detailed description with accompanying drawings.

SUMMARY OF THE INVENTION

The method of charging of the present invention charges a plurality of batteries to full charge with a charging power supply by pulse charging and time-division switching of batteries. Further, in the charging method of the present invention, when charging of a fully charged battery is stopped, timing to begin charging the next battery is moved up.

This method of charging has the characteristic that a plurality of batteries can be fully charged in a shorter time without causing battery performance degradation. This is because when time-division switched pulse charging of a fully charged battery is stopped, timing is moved up to begin charging the next battery. This charging method does not temporarily interrupt charging for a fully charged battery, but rather skips that battery's timing interval and goes to the next battery. Therefore, a plurality of batteries can be quickly and efficiently fully charged. Further, this charging method can fully charge a plurality of batteries in an ideal fashion with a charging power supply which can be inexpensively manufactured. Therefore, this method also has the characteristic that battery charger cost can be reduced.

In the charging method of the present invention, when switching the battery being pulse charged, it is preferable to begin charging the next battery the instant charging of any battery is stopped, avoiding interruption in charging current. Since charging current is not cut-off in this charging method, it has the characteristic of reduced in-rush current and noise when the battery being charged is switched.

Further, in the charging method of the present invention, when charging of a fully charged battery is stopped, it is preferable to begin charging the next battery at that instant without interrupting the charging current.

Further, in the charging method of the present invention, when sequentially pulse charging a plurality of batteries of different battery capacities, the pulse width in time for charging low capacity batteries can be made shorter than the pulse width for high capacity batteries. This controls the average charging current to lower values for lower capacity batteries.

This method of charging has the characteristic ability to pulse charge all batteries in a short time and in an ideal fashion. This is because the pulse width in time can be changed according to the capacity of a battery. By varying the pulse charging duty factor, efficient use of the charging power supply can be increased without changing the total power supply current.

DETAILED DESCRIPTION OF THE INVENTION

Figure 1:
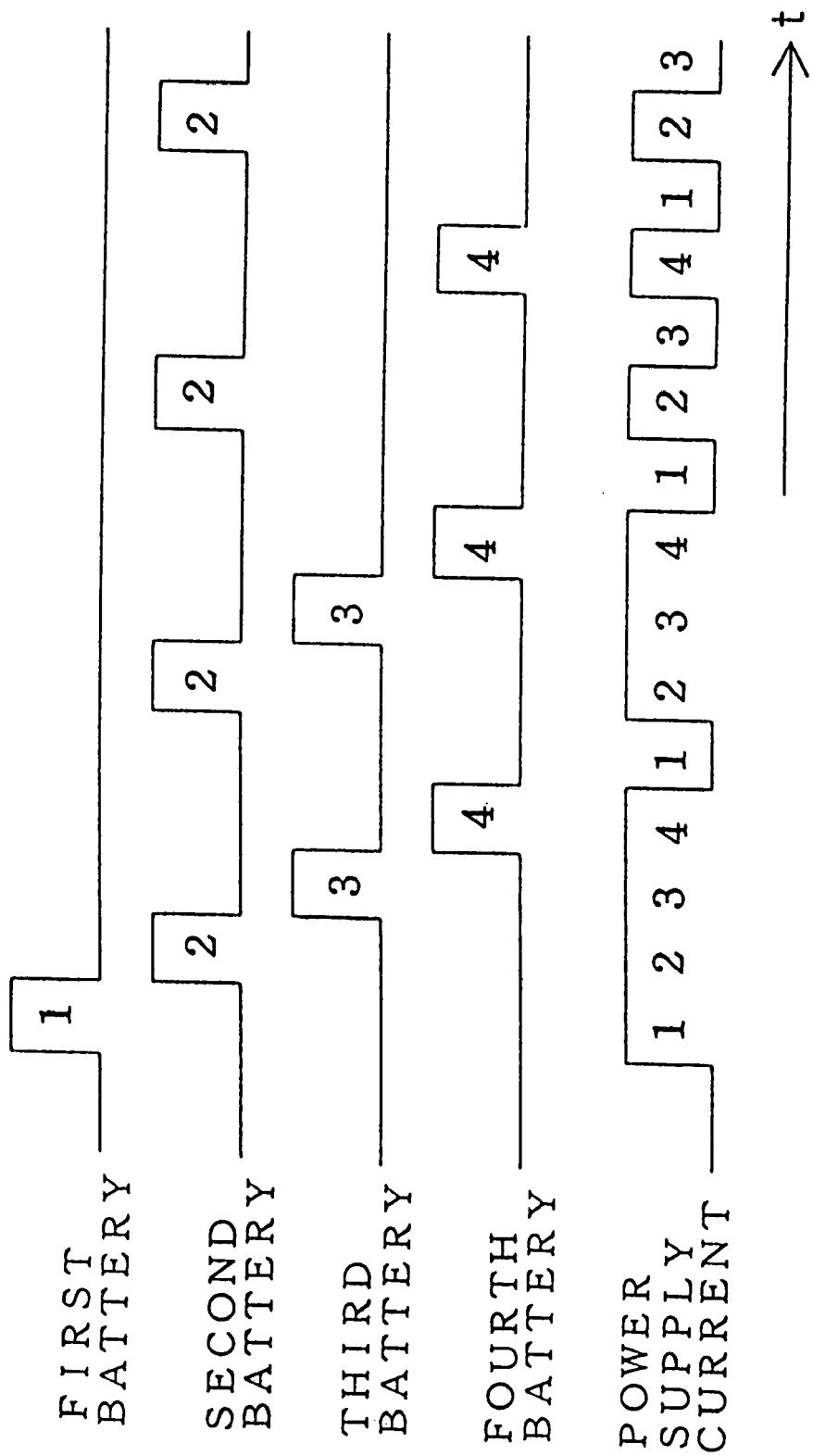
FIG. 1 is a timing chart showing a prior art method of charging a plurality of batteries.
Figure 2:
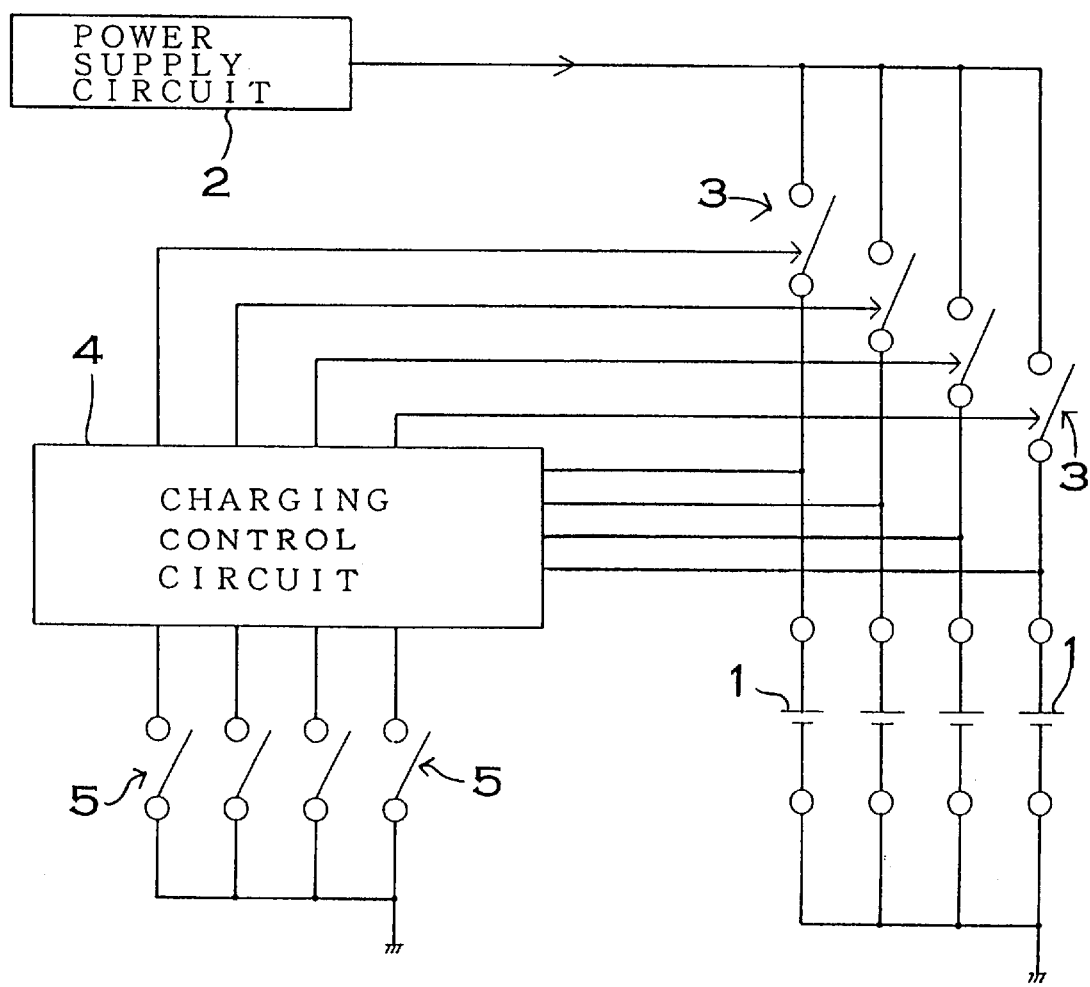
FIG. 2 is a block diagram showing a battery charger used in an embodiment of the method of charging a plurality of batteries of the present invention.

Turning to FIG. 2, a block diagram of a battery charger used in the charging method of the present invention is shown. FIG. 2 shows a battery charger for fully charging four batteries 1 attached in a removable fashion and comprising ch1 through ch4. However, the charging method of the present invention is a pulse charging method for a plurality of batteries and is not limited to charging four batteries. Further, the present invention is also not limited to a method of charging batteries attached in a removable fashion. The present invention can also fully charge multiple batteries divided into a plurality of channels by sequentially charging batteries in each channel.

The battery charger shown in FIG. 2 is provided with a power supply circuit 2, switching devices 3 to connect the power supply circuit 2 with each battery 1, and a charging control circuit 4 to control the switching devices 3. Further, the battery charger of FIG. 2 has charging switches 5 connected to the charging control circuit 4 to determine whether or not the ch1 through ch4 batteries 1 are attached. This battery charger can detect which battery channels are attached and which are not attached by the charging switches 5, and can skip charging channels which are not attached. Therefore, this battery charger can fully charge all batteries in a shorter time when the batteries of any channels are not attached.

However, determination of whether or a not a battery is attached to the battery charger does not necessarily have to be determined by charging switches. This is because battery attachment or lack of attachment can also be determined by measuring charging current. In a method of determining battery attachment by measuring charging current, charging current is measured at the first charging pulse, and channels with no current flow are judged to have no battery attached. Subsequently, charging is performed skipping those channels.

The power supply circuit 2 outputs voltage and current capable of charging the batteries 1. The charging power supply is preferably a switching power supply. The switching power supply is provided with a rectifying circuit to rectify 100V/120V alternating current (AC), a switching circuit to switch direct current (DC) output from the rectifying circuit, a transformer to step down AC voltage output from the switching circuit and input to its primary side to the battery charging voltage, a rectifying circuit of diodes to rectify AC output from the transformer to DC, a CV/CC control circuit to control the switching circuit duty cycle with rectifying circuit output voltage and signals from the control circuit, and an isolating PC circuit. However, the power supply circuit does not necessarily have to be a switching power supply. Power supply circuitry to step down input 100V/120V AC via a transformer, rectify the AC to DC, and stabilize the rectified DC can also be used.

The switching devices 3 are semiconductor switching devices such as field effect transistors (FETs) or bipolar transistors. Each switching device 3 is connected in series with each battery 1 to connect the batteries 1 with the power supply circuit 2. Batteries 1 connected to the power supply circuit 2 via "ON" switching devices 3 are supplied with charging current for charging.

Charging current is cut-off from batteries 1 connected to "OFF" switching devices 3 and those batteries are not charged. One of the plurality of switching devices 3 is "ON" and all others are controlled "OFF" to pulse charge a battery 1.

The charging control circuit 4 controls the switching device 3 connected to each battery 1 "ON" and "OFF". The charging control circuit 4 outputs charging signals to the switching devices 3 to control the switching devices 3 "ON" and "OFF". The charging control circuit 4 determines the order and timing for pulse charging of the plurality of batteries 1.

Figure 3:
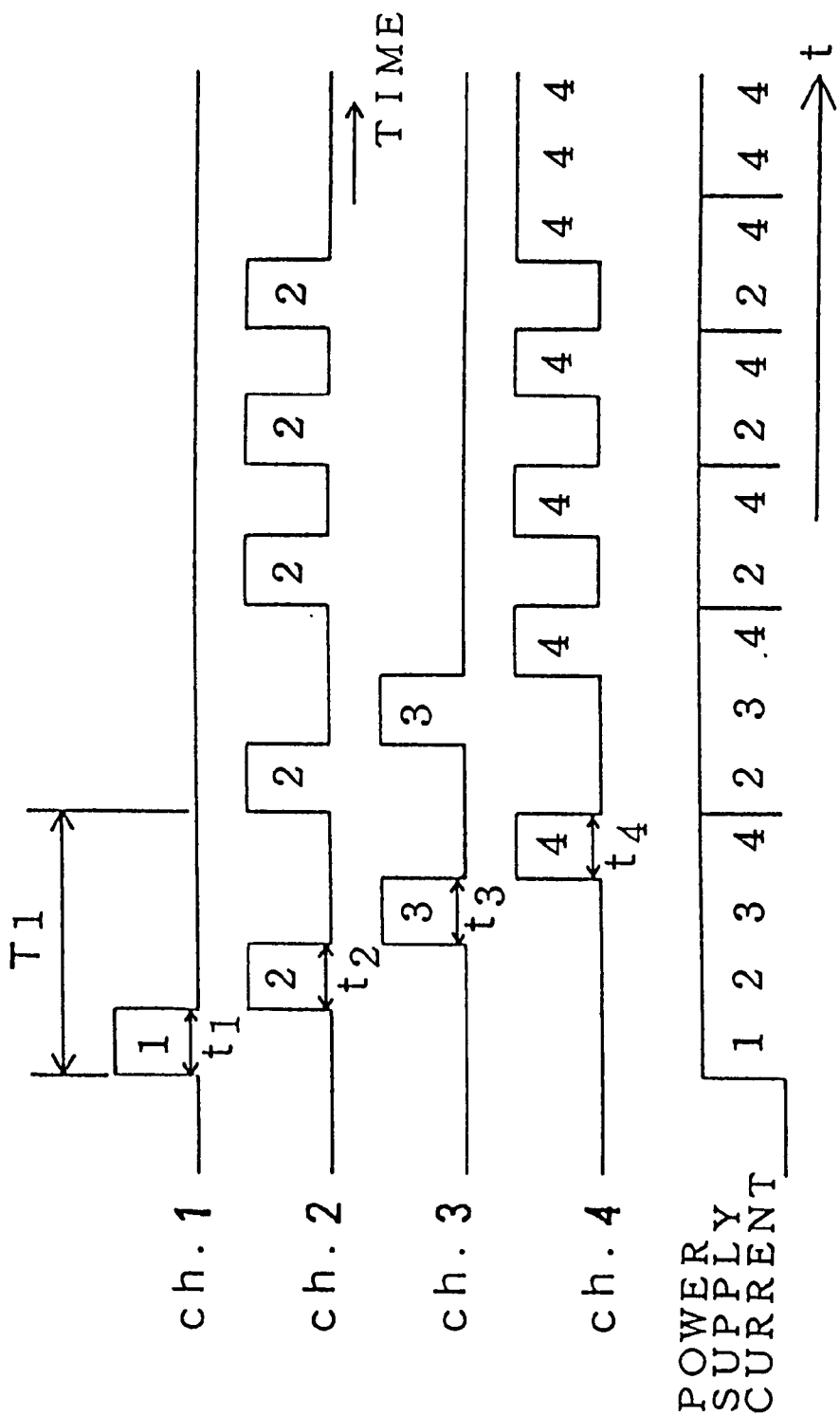
FIG. 3 is a timing chart showing an embodiment of the method of charging a plurality of batteries of the present invention.

The charging control circuit 4 controls the switching devices 3 "ON" and "OFF", and the charging current to charge each battery 1 is as shown in FIG. 3. In FIG. 3, the batteries of ch1 through ch4 are sequentially charged by pulse charging. The charging order for a plurality of batteries may be, for example, starting from the battery closest to full charge. This method minimizes the time to the first fully charged battery. Whether a battery is near full charge or not is determined by battery voltage when charging is initiated.

The width in time of one pulse for pulse charging each battery is determined by the pulse width of the charging signal input to the switching device. For example, the width in time of one pulse may be 1 sec. However, the charging method of the present invention does not restrict the width in time of one pulse for pulse charging a battery. The width in time of one pulse is set, for example, from 50 msec. to 10 sec., preferably 0.1 sec. to 5 sec., more preferably 0.2 sec. to 3 sec., and optimally 0.3 sec. to 2 sec.

When the battery capacity of all the plurality of batteries to be charged is the same, the pulse width of a single pulse (tn) is the same for all batteries. As shown in FIG. 3, all batteries are charged with the same single pulse width (t1, t2, t3, t4). When a plurality of batteries of different capacities are charged in sequence, the single pulse width of low capacity batteries is made shorter than the single pulse width of high capacity batteries. This method has the characteristic that low capacity batteries and high capacity batteries can be fully charged quickly and in an evenly balanced fashion. This is because the average charging current for low capacity batteries with shorter pulse width is lower than the average charging current for high capacity batteries.

Figure 4:
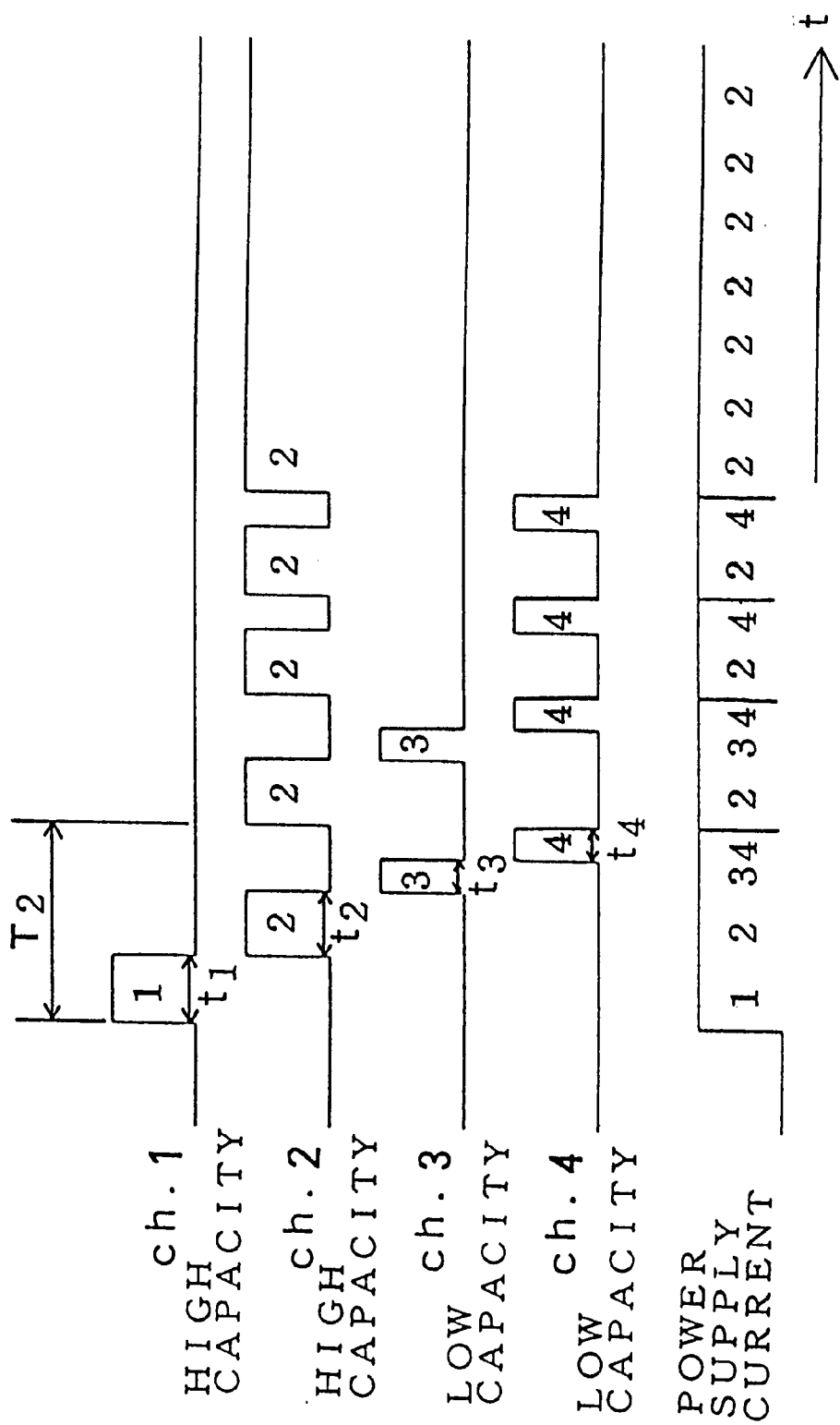
FIG. 4 is a timing chart showing another embodiment of the method of charging a plurality of batteries of the present invention.

Turning to FIG. 4, charging current is shown with shorter pulse width for the low capacity batteries of ch3 and ch4 compared to the high capacity batteries of ch1 and ch2. In FIG. 4, the pulse widths (t3, t4) for charging the batteries of ch3 and ch4 are approximately ½ the pulse widths (t1, t2) for the batteries of ch1 and ch2, and the average charging currents for ch3 and ch4 are ½ those for ch1 and ch2. In a method which charges low capacity batteries with reduced pulse width (t3, t4) and which does not cut-off charging current, the charging time for low capacity batteries is reduced and the period for charging all batteries with a single pulse is shortened. This means average charging current for high capacity batteries can be increased to reach full charge in a shorter time. This is because the average charging current for a high capacity battery is proportional to the width in time of one pulse divided by the period (T) for charging all batteries with a single pulse.

The period (T) for charging all batteries with a single pulse is equal to the sum of the single pulse widths for charging each battery, namely, t1+t2+t3+t4. As shown in FIG. 3, when the all batteries are charged with equal pulse widths, the time for one period is one pulse width times the number of batteries being charged. As shown in FIG. 4, for the case of different pulse widths, the period (T) is shorter than the (long) pulse width times the number of batteries.

As shown in FIGS. 3 and 4, in the method of charging of the present invention, when the battery being pulse charged is switched, charging current is not cut-off. Specifically, when charging of the previous battery is stopped and charging of the next battery is started, charging of the next battery begins the instant charging of the previous battery ends. As shown in FIGS. 3 and 4, this charging method can charge a plurality of batteries without changing the current output from the power supply circuit. Further, the charging method shown in FIGS. 3 and 4 also does not cut-off charging current when charging of a fully charged battery is ended and charging of the next battery is started.

However, in the method of charging of the present invention, when the battery being charged is switched, a pause in charging may also be established. The time period for a pause in charging is made sufficiently shorter than the width in time of one pulse. This is because a long pause will make the time to fully charge all batteries longer.

The method of charging of the present invention skips over fully charged batteries and begins charging the next battery. In FIG. 3, when none of the batteries are fully charged, charging is performed in the order ch1, ch2, ch3, ch4. After the battery of ch1 becomes fully charged, charging of the ch1 battery is skipped and charging is performed in the order ch2, ch3, ch4. After the battery of ch3 becomes fully charged, charging is performed in the order ch2, ch4. Finally, after the battery of ch2 becomes fully charged, only the battery of ch4 is continuously charged.

In FIG. 4, when none of the batteries are fully charged, charging is performed in the order ch1, ch2, ch3, ch4. After the battery of ch1 becomes fully charged, charging of the ch1 battery is skipped and charging is performed in the order ch2, ch3, ch4. After the battery of ch3 becomes fully charged, charging is performed in the order ch2, ch4. Finally, after the battery of ch4 becomes fully charged, only the battery of ch2 is continuously charged.

The charging control circuit 4 detects the fully charged state of a battery 1, and instead of turning the switching device connected to the fully charged battery "ON", it turns "ON" the switching device connected to the next battery to be charged. The charging control circuit 4 detects the fully charged state of a battery 1 by different methods depending on the type of battery 1. For nickel-cadmium and nickel-hydrogen batteries, full charge is determined by detecting when battery voltage reaches a peak, or by detecting a DV drop from the peak voltage. For lithium-ion rechargeable batteries, full charge is determined by detecting when battery voltage reaches a specified voltage.

The charging control circuit 4 maintains the switching device connected to a fully charged battery "OFF", and turns the switching device connected to the next battery to be charged "ON" during the interval previously used to charge the fully charged battery. This carry-forward in timing is continued while non-fully charged batteries are sequentially charged until al batteries reach full charge, at which time all switching devices are maintained "OFF" and charging is complete. After all batteries have reached full charge, all batteries may be trickle charged by a small trickle current. Trickle charging may be pulse charging with a current sufficiently smaller than that used for rapid charging, or all batteries may be connected in parallel and charged with constant voltage and constant current.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within the meets and bounds of the claims or equivalence of such meets and bounds thereof are therefore intended to be embraced by the claims.

What is claim is:

1. A method of charging a plurality of batteries which uses a charging power supply to pulse charge a plurality of batteries to full charge by time-division switching of the battery being charged, and
   which moves timing intervals forward to begin charging the next battery when charging of a fully charged battery is stopped.

2. A method of charging a plurality of batteries as recited in claim 1 wherein batteries to be charged are divided into a plurality of channels, batteries are attached to each channel in a detachable fashion, channels with batteries attached and without batteries attached are detected, and channels without batteries attached are skipped over and not charged.

3. A method of charging a plurality of batteries as recited in claim 2 wherein battery attachment is detected by charging current.

4. A method of charging a plurality of batteries as recited in claim 2 wherein battery attachment is detected by charging switches.

5. A method of charging a plurality of batteries as recited in claim 1 wherein the plurality of batteries are connected to power supply circuit via switching devices, and any one of the switching devices is turned on to charge the batteries in sequence.

6. A method of charging a plurality of batteries as recited in claim 1 wherein batteries near full charge are charged first.

7. A method of charging a plurality of batteries as recited in claim 1 wherein one pulse width in time for pulse charging batteries is from 50 msec to 10 sec.

8. A method of charging a plurality of batteries as recited in claim 1 wherein one pulse width in time for pulse charging batteries is from 0.1 sec to 5 sec.

9. A method of charging a plurality of batteries as recited in claim 1 wherein one pulse width in time for pulse charging batteries is from 0.3 sec to 2 sec.

10. A method of charging a plurality of batteries as recited in claim 1 wherein trickle charging with a small current is performed after the batteries are fully charged.

11. A method of charging a plurality of batteries as recited in claim 1 wherein when switching the battery to be pulsed charged, the instant charging of any battery is stopped, charging of the next battery to be charged is started and charging current is not cut-off.

12. A method of charging a plurality of batteries as recited in claim 11 wherein the instant charging of a fully charged is stopped, charging of the next battery to be charged is started and charging current is not cut-off.

13. A method of charging a plurality of batteries as recited in claim 1 wherein a plurality of batteries with different battery capacities are pulse charged in sequence, and one pulse width in time for pulse charging low capacity batteries is shorter than one pulse width in time for pulse charging high capacity batteries.

* * * * *